US009139138B2

(12) United States Patent
Fisher

(10) Patent No.: US 9,139,138 B2
(45) Date of Patent: Sep. 22, 2015

(54) SYSTEM FOR EXPANDING AND SECURING TRUCK BED STORAGE AND METHOD FOR DOING THE SAME

(71) Applicant: Paul W. Fisher, San Juan Capistrano, CA (US)

(72) Inventor: Paul W. Fisher, San Juan Capistrano, CA (US)

(73) Assignee: Paul W Fisher, San Juan Capistrano, CA (US)

( * ) Notice: Subject to any disclaimer, the term of this patent is extended or adjusted under 35 U.S.C. 154(b) by 0 days.

(21) Appl. No.: 13/957,364

(22) Filed: Aug. 1, 2013

(65) Prior Publication Data

US 2015/0034688 A1 Feb. 5, 2015

(51) Int. Cl.
*B60R 9/06* (2006.01)
*B60P 7/06* (2006.01)
*B60R 13/01* (2006.01)
*B60P 7/08* (2006.01)
*B62D 33/02* (2006.01)
*B60R 7/02* (2006.01)

(52) U.S. Cl.
CPC .................. *B60R 9/06* (2013.01); *B60P 7/0807* (2013.01); *B60R 7/02* (2013.01); *B60R 13/01* (2013.01); *B62D 33/0207* (2013.01)

(58) Field of Classification Search
CPC ............ B60P 7/06; B60P 7/08; B60P 7/0807; B60R 9/06; B60R 13/01; B60R 13/011; B60R 2011/004; B62D 33/02; B62D 33/0207
USPC ............ 296/37.1, 37.6, 39.2, 100.01, 100.02; 224/402, 403, 404, 539
See application file for complete search history.

(56) References Cited

U.S. PATENT DOCUMENTS

| 4,394,100 | A | | 7/1983 | Sperlich |
|---|---|---|---|---|
| 4,733,898 | A | | 3/1988 | Williams |
| 5,094,375 | A | * | 3/1992 | Wright ........................ 224/404 |
| 5,360,250 | A | * | 11/1994 | Wood et al. .................. 296/39.2 |
| 5,979,963 | A | | 11/1999 | Jordon |
| 2009/0008960 | A1 | * | 1/2009 | Smith ........................... 296/164 |

* cited by examiner

*Primary Examiner* — Jason S Daniels

(57) ABSTRACT

A system is configured to expand and secure storage in a pickup truck with a truck cab and a truck tail gate. The system includes a tray floor mechanically coupled to tray sides and tray ends forming an open parallelepiped configured to fit immediately adjacent to the truck cab and the truck tail gate covering a truck bed. The open parallelepiped has a depth that does not go below wheel wells on the pickup truck. The system connects to the truck cab and the truck tail gate in order to secure truck bed storage.

6 Claims, 4 Drawing Sheets

SYSTEM FOR EXPANDING AND SECURING TRUCK BED STORAGE AND METHOD FOR DOING THE SAME

BACKGROUND

The embodiments herein relate generally to automotive accessories. In particular the embodiments herein relate to accessories for pickup truck beds.

Prior to embodiments of the disclosed invention, pickup trucks had beds that were not secure and did not provide protection to hostile weather. The prior art includes: U.S. Pat. No. 5,979,963 issued to Jordon; U.S. Pat. No. 4,733,898 issued to Williams; and U.S. Pat. No. 4,394,100 issued to Sperlich.

Jordon teaches a device that fits into the C-Channel of a truck bed covering the truck bed but without an upper recessed surface that creates an upper storage area. Williams teaches a truck bed storage assembly that rests upon the truck bed, rather than utilizing the C-channels to create an upper storage area and a lower storage area. Sperlich teaches making recessed channels into a truck bed and then inserting a sheet of plywood into the channels to create an upper and lower storage area. Sperlich teaches modifying the truck, whereas embodiments of the present invention require no such modifications.

SUMMARY

A system is configured to expand and secure storage in a pickup truck with a truck cab and a truck tail gate. The system includes a tray floor mechanically coupled to tray sides and tray ends forming an open parallelepiped configured to fit immediately adjacent to the truck cab and the truck tail gate covering a truck bed. The open parallelepiped has a depth that does not go below wheel wells on the pickup truck. The system connects to the truck cab and the truck tail gate in order to secure truck bed storage.

In some embodiments, channels are mechanically coupled to the pickup truck. Guides are mechanically coupled to the tray sides. The channels can accommodate the guides to secure the system in the pickup truck.

In some embodiments, stake pocket holes are bored into the pickup truck. Tray flanges are mechanically coupled to the tray sides and perforated with flange pocket holes. A collared stake cleat is inserted through each stake pocket hole and each flange pocket hole to secure the system to the pickup truck.

In some embodiments, drain holes are bored into the tray floor to allow liquid to drain from the system to the truck bed. Ridges are mechanically coupled to the tray floor to prevent system contents from moving.

A process enables a user to expand and secure storage in a pickup truck with a truck cab and a truck tail gate. The process includes the following steps, not necessarily in order. A user forms an open parallelepiped with a tray floor mechanically coupled to tray sides and tray ends such that the open parallelepiped connects to the truck cab and the truck tail gate. The user secures the open parallelepiped to the truck cab and tail gate in order to prevent access to truck bed storage.

In some embodiments, the user attaches channels to the pickup truck and attaches guides to the tray sides. The user places the guides in the channels to secure the open parallelepiped to the pickup truck and the truck tail gate.

In some embodiments the user bores stake pocket holes into the pickup truck, attaches tray flanges to the tray sides, bores flange pocket holes onto the tray flanges and aligns the stake pocket holes with the flange pocket holes. The user then inserts a collared stake cleat through the stake pocket holes and the flange pocket holes to secure the storage.

In some embodiments, the user bores drain holes through the tray floor to allow liquid to drain from the system to a truck bed. The user can install ridges onto the tray floor to prevent material from moving.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
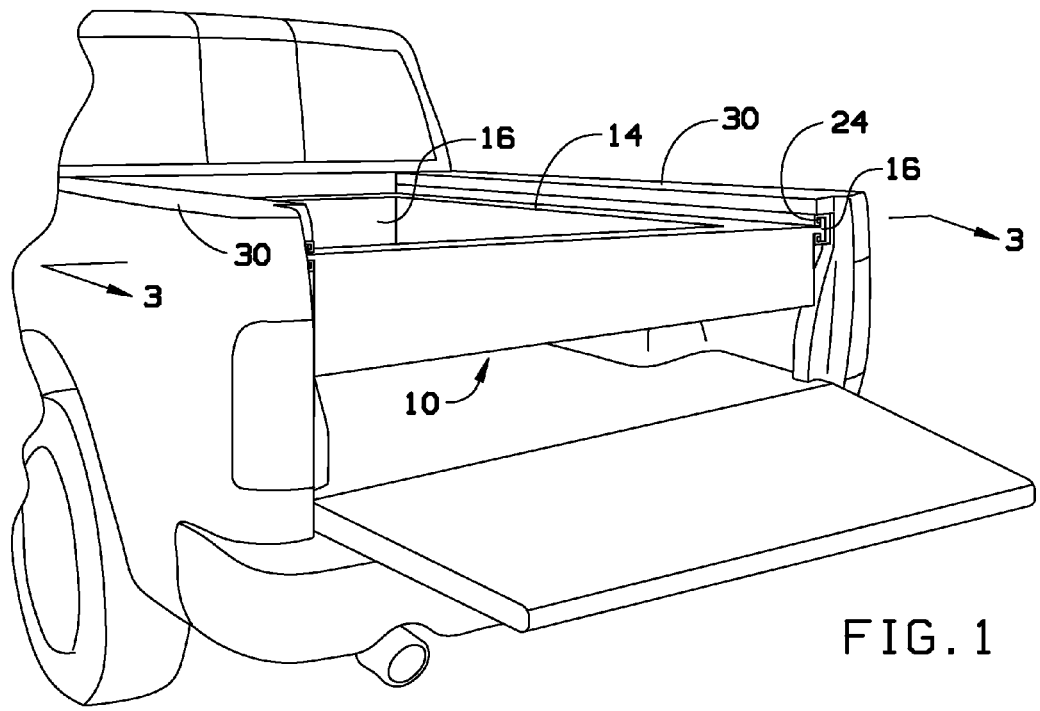
FIG. 1 is perspective a view of an embodiment of the invention, shown in use.
Figure 3:
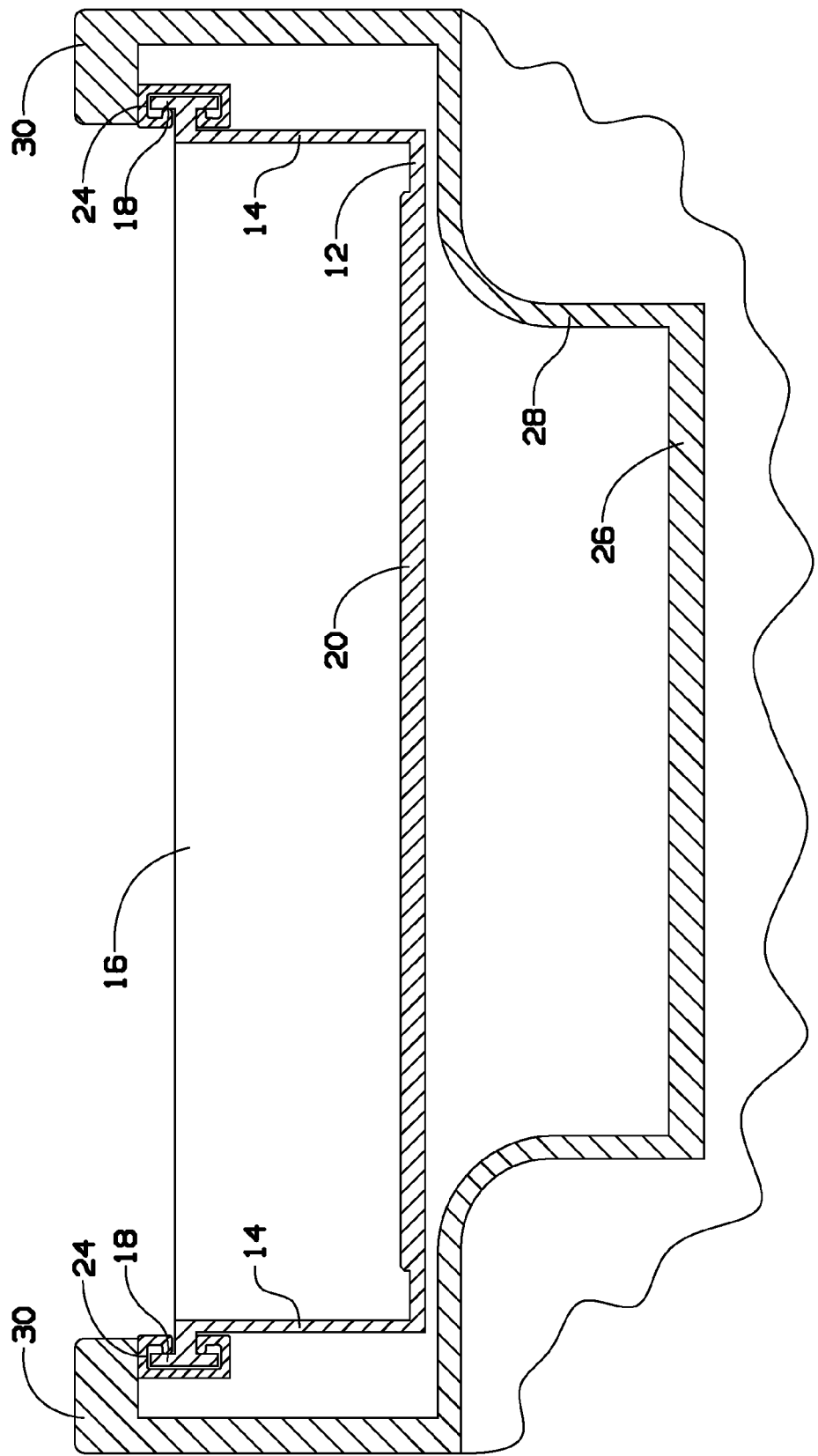
FIG. 3 is a section view of an embodiment of the invention, taken along line 3-3 in FIG. 1.

By way of example, and referring to FIG. 1 and FIG. 3, a pickup truck comprises side rails 30 mechanically coupled to channel 24. Side rails 30 are mechanically coupled to wheel wells 28 and truck bed 26. Wheel wells 28 are also mechanically coupled to truck bed 26.

System 10 provides expansion and securement for truck bed storage immediately adjacent to truck bed 26. System 10 comprises tray floor 12 mechanically coupled to tray sides 14 and tray ends 16. The use of tray sides 14 and tray ends 16 creates an open parallelepiped which can fit immediately adjacent to a truck cab and a truck tail gate. Tray sides 14 and tray ends 16 render the open parallelepiped at a depth which is above or on wheel wells 28. When the tail gate is locked system 10 cannot be removed and the truck bed storage is secure from theft because access to the truck bed storage or other material is prevented.

Figure 2:
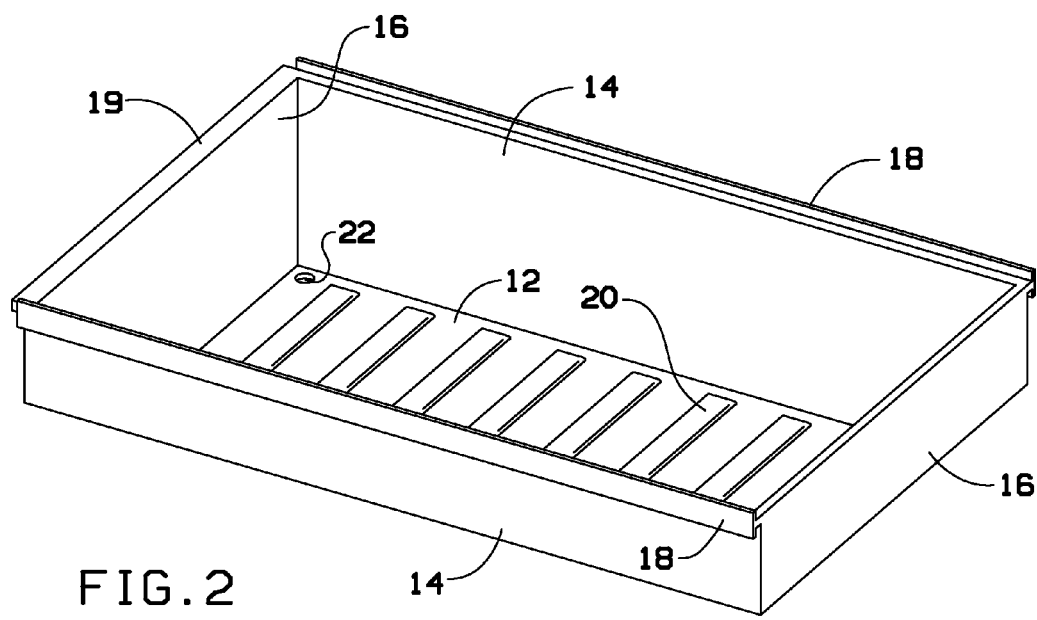
FIG. 2 is a perspective view of an embodiment of the invention.

Turning to FIG. 2, in some embodiments, guides 18 are mechanically coupled to tray ends 16 which can be used to fit into channel 24. Front tray end 16 is mechanically coupled to front lip 19 which can fit immediately adjacent to front tray end 16. Tray floor 12 is mechanically coupled to ridges 20 which can be prevent system contents from moving. Tray floor 12 is perforated with one or more drain holes 22 which can be used to drain rain water or any other liquid from system 10 into the truck bed if that feature is desired.

Figure 5:
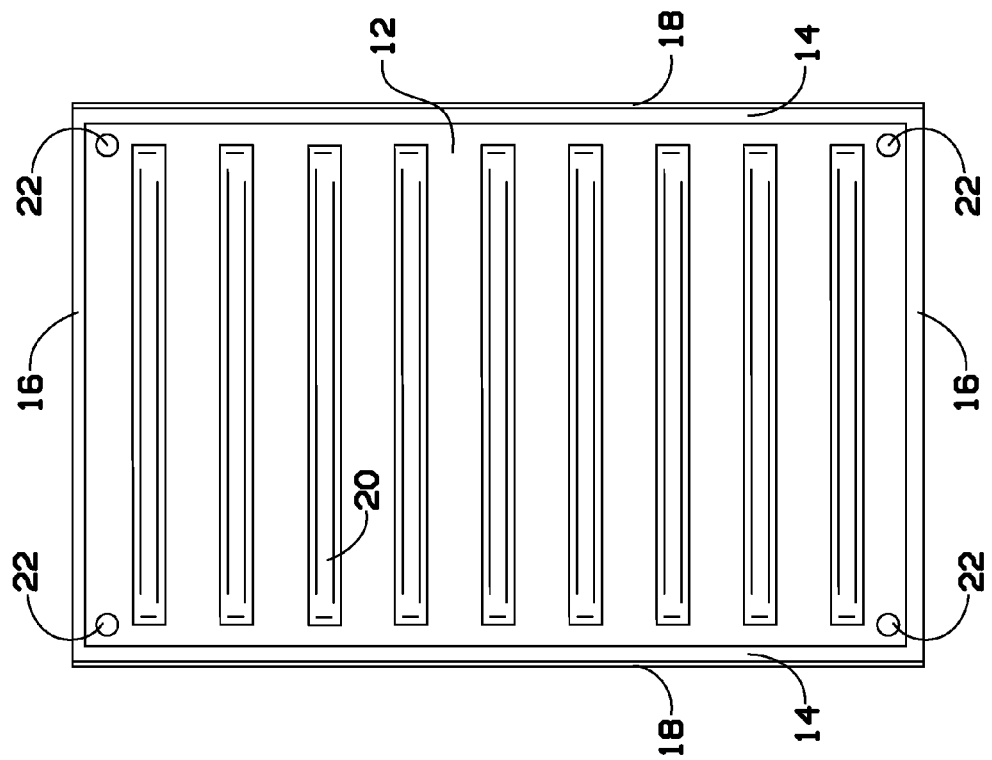
FIG. 5 is a top view of an embodiment of the invention.
Figure 4:
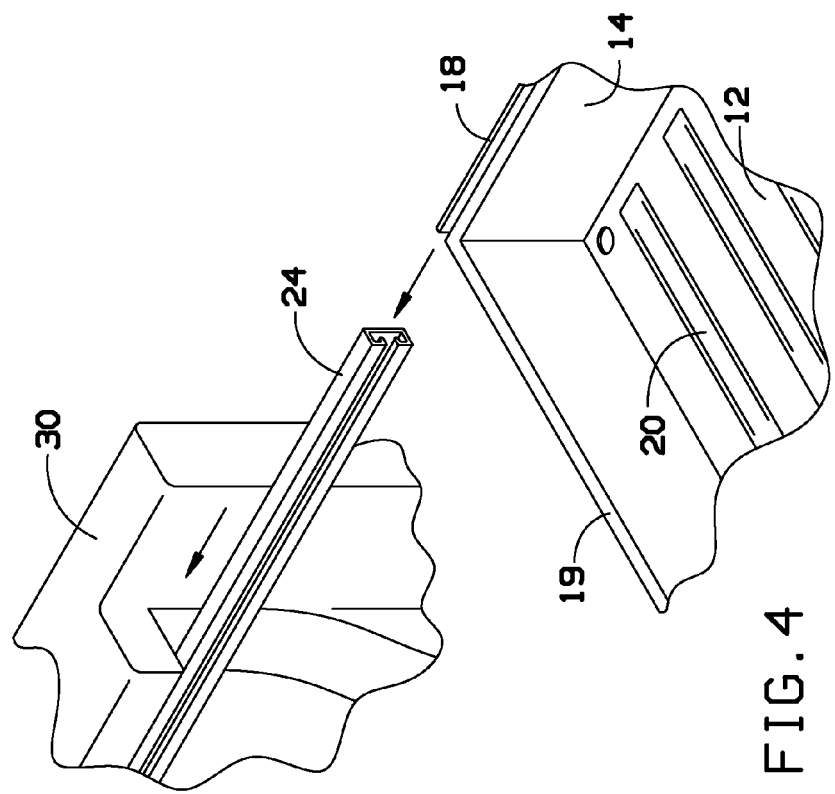
FIG. 4 is a detail perspective view of an embodiment of the invention, illustrating placement of the channel and the guides.
Figure 7:
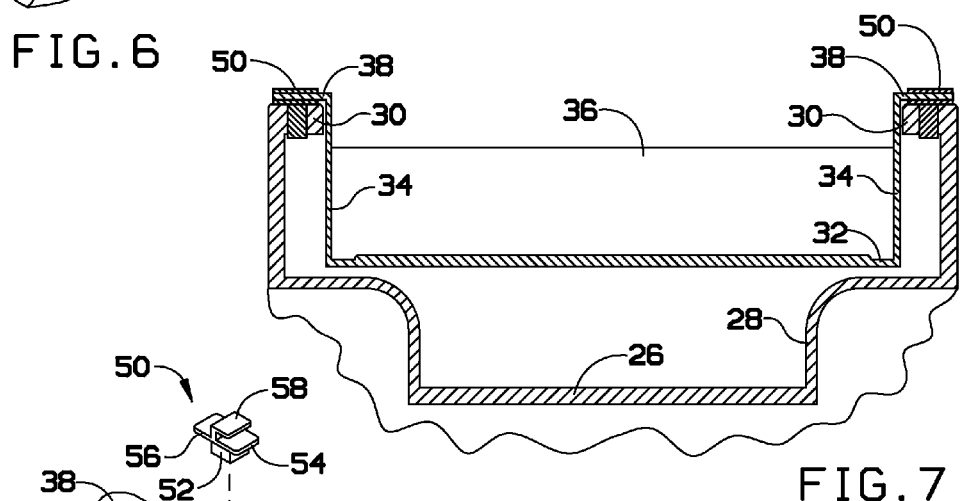
FIG. 7 is a section view of an alternate embodiment of the invention.
Figure 8:
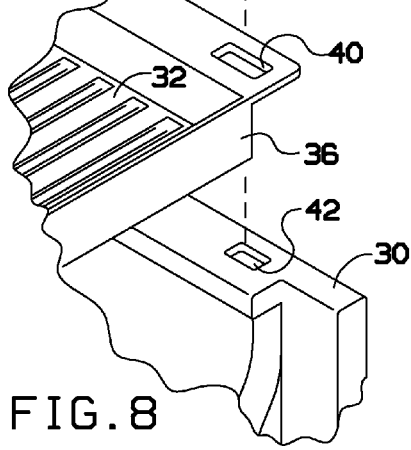
FIG. 8 is a detail perspective view of an alternate embodiment of the invention, illustrating the alignment of the flange holes with the stake pocket holes.

FIG. 4 and FIG. 5 provide one embodiment of a process to secure truck bed storage while increasing truck bed storage. First, a user needs to install channel 24 into side rail 30 on both the left side and the right side of the truck bed. In many models, channel 24 is already installed. An alternate embodiment of this process which does not involve channels 24 is shown in FIG. 7 and FIG. 8 below. Next a user attaches guides 18 onto system 10. This could be done in the material working process which created system 10 in the first instance. In some embodiments the user can attach front lip 19 onto system 10. In any case, the user then inserts guides 18 into channels 24 until front lip 19 contacts the truck cab.

In some embodiments, water can drain through drain hole 22 or a plurality of drain holes 22. In some embodiments a user can install ridges 20 in order to prevent system storage from moving while the pickup truck is in transit.

Figure 6:
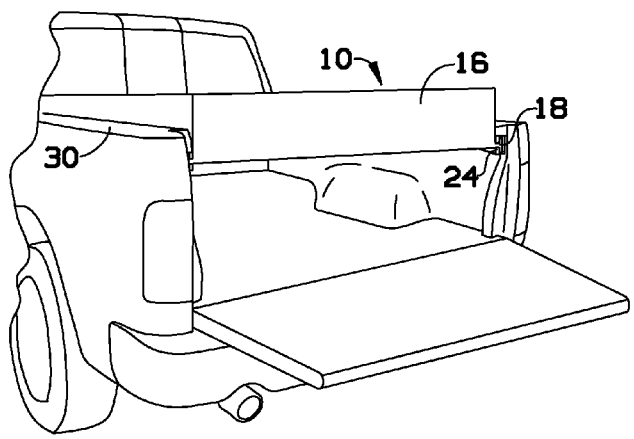
FIG. 6 is a perspective view of an embodiment of the invention, illustrating its alternative position.

Turning to FIG. 6, in some embodiments, a user may desire to have secure expanded storage in the truck bed. This can be accomplished by inserting guides 18 into channels 24 such that tray floor 12 is distant the truck bed effectively flipping system 10 over. This is contrary to the Figures above where tray floor 12 is proximate the truck bed.

Turning to FIG. 7 and FIG. 8 as noted above, not every truck on the marketplace has channels 24 installed and one advantage over Sperlich is the ability to use system 10 as an aftermarket accessory without have to modify the pickup truck itself. FIG. 7 and FIG. 8 show an alternate embodiment of the disclosed invention where side rail 30 is perforated with stake pocket holes 42.

System 10 comprises tray floor 32 mechanically coupled to tray sides 34 and tray ends 36. Tray sides 36 are further mechanically coupled to tray flanges 38 which are perforated with flange pocket holes 40.

A user can align flange pocket holes 40 with stake pocket holes 42 to insert collared stake cleat 50 which will hold system 10 to the pickup truck. Collared stake cleat 50 includes a lower portion 52 which goes through stake pocket hole 42, a flange portion 54, an upstanding central portion 56, and a cantilevered upper portion 58, where the flange pocket holes 40 drop over collared stake cleat 50 and slides forward between the flange portion 54 and the cantilevered upper portion 58 completing the mechanical couple.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system configured to expand and secure storage in a pickup truck with a truck bed extending from a leading edge on the truck bed to a truck tail gate and having stake pocket holes; the system comprising:
    a tray floor mechanically coupled to tray sides and tray ends forming an open parallelepiped configured to fit immediately adjacent to the truck cab and the truck tail gate covering the truck bed;
    tray flanges, mechanically coupled to the tray sides and perforated with flange pocket holes;
    a collared stake cleat, further comprising a lower portion, a flange portion, an upstanding central portion, and a cantilevered upper portion, wherein the flange pocket holes drop over the collared stake cleat and slide forward between the flange portion and the cantilevered upper portion;
    wherein the open parallelepiped has a depth that does not go below tops of wheel wells on the pickup truck and
    wherein the system extends from the leading edge to the truck tail gate in order to secure truck bed storage.

2. The system of claim 1, wherein drain holes are bored into the tray floor to allow liquid to drain from the system to the truck bed.

3. The system of claim 1, wherein ridges are mechanically coupled to the tray floor to prevent system contents from moving.

4. A process for expanding and securing storage in a pickup truck having a truck bed extending from a leading edge on the truck bed to a truck tail gate and having stake pocket holes; the process comprising:
    forming an open parallelepiped with a tray floor mechanically coupled to tray sides and tray ends such that the open parallelepiped extends from the leading edge to the truck tail gate; and
    securing the open parallelepiped to the stake pocket holes with a collared stake cleat in order to prevent access to truck bed storage
    boring stake pocket holes into the pickup truck; attaching tray flanges to the tray sides; boring flange pocket holes onto the tray flanges; aligning the stake pocket holes with the flange pocket holes; and inserting a collared stake cleat through the stake pocket holes and the flange pocket holes;
    wherein the collared stake cleat, further comprises a lower portion, a flange portion, an upstanding central portion, and a cantilevered upper portion, wherein the flange pocket holes drop over the collared stake cleat and slide forward between the flange portion and the cantilevered upper portion.

5. The process of claim 4, further comprising: boring drain holes through the tray floor to allow liquid to drain from the system to a truck bed.

6. The process of claim 4, further comprising: installing ridges onto the tray floor to prevent material from moving.

* * * * *